United States Patent
Moune et al.

(10) Patent No.: US 9,481,472 B2
(45) Date of Patent: Nov. 1, 2016

(54) ENERGY PROTECTION DEVICE FOR AN AIRCRAFT

(71) Applicant: AIRBUS OPERATIONS (SAS), Toulouse (FR)

(72) Inventors: Marie-Claire Moune, Tournefeuille (FR); Jean Muller, Tournefeuille (FR); Christophe Poujol, Saint-Jory (FR); Julien Fontan, Toulouse (FR)

(73) Assignee: Airbus Operations (SAS), Toulouse (FR)

( * ) Notice: Subject to any disclaimer, the term of this patent is extended or adjusted under 35 U.S.C. 154(b) by 118 days.

(21) Appl. No.: 14/593,739

(22) Filed: Jan. 9, 2015

(65) Prior Publication Data
US 2015/0191251 A1 Jul. 9, 2015

(30) Foreign Application Priority Data
Jan. 9, 2014 (FR) ..................... 14 50141

(51) Int. Cl.
*B64D 31/06* (2006.01)
*B64C 13/50* (2006.01)

(52) U.S. Cl.
CPC ............. *B64D 31/06* (2013.01); *B64C 13/503* (2013.01)

(58) Field of Classification Search
CPC ...... B64D 31/06; B64D 25/00; B64D 31/10; B64C 13/503; B64C 13/18; B64C 19/00
See application file for complete search history.

(56) References Cited

U.S. PATENT DOCUMENTS

| 5,803,408 A | 9/1998 | Gast |
| 6,880,784 B1* | 4/2005 | Wilkinson ............. B64D 31/06 244/195 |
| 2008/0208398 A1* | 8/2008 | Delaplace ............. B64D 31/08 701/3 |
| 2010/0100262 A1* | 4/2010 | Blanvillain .......... G05D 1/0072 701/14 |

FOREIGN PATENT DOCUMENTS

| EP | 1 744 232 | 1/2007 |
| FR | 2 973 777 | 10/2012 |

OTHER PUBLICATIONS

FR Search Report for FR Application No. 1450141, dated Sep. 25, 2014, 2 pages.

* cited by examiner

*Primary Examiner* — Valentina Xavier
(74) *Attorney, Agent, or Firm* — Nixon & Vanderhye P.C.

(57) ABSTRACT

Energy protection device for an aircraft.
The device (1) comprises units (12, 14, 15) for automatically deactivating an energy protection function, if a return of the aircraft to an operational flight domain is detected after the activation of this protection function, and for automatically managing an autothrust (2), if at least one of the following conditions is satisfied: a relaxing of a control member is detected, and the angle of attack of the aircraft is below a predetermined threshold.

9 Claims, 1 Drawing Sheet

ENERGY PROTECTION DEVICE FOR AN AIRCRAFT

This application claims priority to FR Application No. 14 50141, filed 9 Jan. 2014, the entire contents of which is hereby incorporated by reference.

The present invention relates to an energy protection device for an aircraft, notably a transport airplane.

More specifically, said device is intended to protect the aircraft against low energy situations (low speed, high angle of attack, low engine thrust), notably close to the ground.

BACKGROUND OF THE INVENTION

Generally, such a device usually comprises:
- means for automatically and repetitively monitoring, during a flight of the aircraft, a plurality of aircraft data so as to be able to detect a low energy situation, for which conditions relating to a low energy are satisfied; and
- means for automatically activating, if such a low energy situation is detected, a protection function consisting in automatically engaging an autothrust and in automatically controlling the engines of the aircraft so that they supply a maximum thrust.

The protection function which is defined in the flight guidance and control computers of the aircraft therefore generates, in all the cases where the aircraft is in a low energy situation, an automatic increase in the thrust to reach the maximum engine thrust, and does so regardless of the initial position of the aircraft throttles.

DESCRIPTION OF THE PRIOR ART

From the documents FR-2 890 645 and WO-2007/031634, an energy protection device for an airplane is known which is provided with at least one engine arranged on each of its wings and at least one additional engine. When the conditions for triggering a previously activated protection function are no longer satisfied, the autothrust remains engaged, the maximum thrust is still ordered to the engines, and an appropriate message is displayed on a flight mode indicator of the aircraft. The protection function is deactivated by the disengagement of the autothrust, which therefore entails a manual action on the part of the pilot.

To remedy this drawback, the documents FR 2 973 777 and U.S. 2013/0110324 disclose similar devices which automatically deactivate the protection function as soon as the conditions for triggering the protection function are no longer satisfied, notably when the speed of the aircraft is above a threshold speed defined by the flight conditions. These devices then automatically deactivate the autothrust to set it to a position which depends on its initial position, that is to say before the triggering of the protection function.

However, there are situations which require a maximum engine thrust to be maintained, even if the conditions of engagement of the protection function are no longer fulfilled. In effect, in the case of a maneuver to avoid another aircraft for example, the aircraft must be capable of nosing up with the engines at full power. In the opposite case, the aircraft is obliged to perform a nose-down, the pilots having to bring the engine control throttles manually into a position of TOGA (Take-Off/Go-Around) type, to increase the power of the engines. Thus, the drawback of a device configured to trigger then automatically deactivate an energy protection mode as a function of flight parameters is the risk of exiting from this mode at the time of an avoidance maneuver.

SUMMARY OF THE INVENTION

The object of the present invention is to remedy this drawback. It relates to an energy protection method for an aircraft which is provided with at least one engine, an autothrust, and at least one piloting control member, said method consisting:
a) in automatically and repetitively monitoring, during a flight of the aircraft, a plurality of aircraft data, including an angle of attack of the aircraft, so as to be able to detect a trigger situation, for which conditions for triggering an energy protection are satisfied;
b) if a trigger situation is detected, in automatically activating a protection function consisting in automatically engaging said autothrust if it is not already engaged and in automatically controlling said engine for it to supply a maximum thrust, and in implementing a monitoring consisting in automatically and repetitively monitoring aircraft parameters, so as to be able to detect a return of the aircraft to a predetermined operational flight domain; and
c) if a return of the aircraft to said operational flight domain is detected, in automatically deactivating the protection function.

According to the invention, said energy protection method is noteworthy in that it consists, in the step c), in automatically deactivating the protection function only if at least one of the following conditions is satisfied:
- a relaxing of the control member is detected; and
- the angle of attack of the aircraft is below a predetermined threshold.

Thus, by virtue of the invention, if a return to the operational flight domain is detected, the energy protection function is not deactivated as long as neither of the two preceding conditions is satisfied. Thus, in the case of an avoidance maneuver, the energy protection mode does not risk being deactivated when the maneuver demands a maximum thrust of the engine or engines, and this applies even if the energy protection activation conditions are no longer satisfied.

According to different embodiments of the invention, which can be taken in combination or separately:
- the relaxing of the control member is detected when the control member is in a position below a first predetermined nose-up threshold,
- the angle of attack of the aircraft comprises a compensation term,
- in the step b), a return of the aircraft to said operational flight domain is detected when the following two conditions are simultaneously satisfied:
  - a current corrected speed of the aircraft is above, for at least a predetermined duration, a minimum reference speed dependent on the current flight configuration of the aircraft; and
  - the conditions for triggering the energy protection are no longer satisfied,
- the method consists:
  - in the case of deactivation of the protection function in the step b), in automatically recording the state of engagement of the autothrust at the time of activation; and
  - at the time of deactivation of the protection function in the step c), in automatically bringing the autothrust into a state of engagement dependent on said recorded state of engagement,
- the conditions for triggering the energy protection are as follows:

the angle of attack of the aircraft is above a predetermined value; and the control member is in a position above a second predetermined nose-up threshold, said method comprises, in addition, a step of automatically displaying an activation of the energy protection function when it occurs.

The present invention relates also to an energy protection device for an aircraft which is provided with at least one engine, an autothrust, and at least one piloting control member, said device comprising:

a monitoring unit configured to automatically and repetitively monitor, during a flight of the aircraft, a plurality of aircraft data, including an angle of attack of the aircraft, so as to be able to detect a trigger situation, for which conditions for triggering an energy protection are satisfied;

an activation unit configured to automatically activate, if a trigger situation is detected, a protection function consisting in automatically engaging said autothrust if it is not already engaged and in automatically controlling said engine for it to supply a maximum thrust;

an auxiliary monitoring unit configured to, in the case of triggering of said protection function, implement a monitoring consisting in automatically and repetitively monitoring aircraft parameters, so as to be able to detect a return of the aircraft to a predetermined operational flight domain; and a deactivation unit to, if a return of the aircraft to said operational flight domain is detected, automatically deactivate the protection function.

According to the invention, the energy protection device is noteworthy in that said deactivation unit is configured to automatically deactivate the protection function, only if at least one of the following conditions is satisfied:

a relaxing of the control member is detected; and the angle of attack of the aircraft is below a predetermined threshold.

Preferably, said energy protection device comprises a recording unit configured to automatically record, in the case of activation of the protection function, the state of engagement of the autothrust at the time of the triggering, said deactivation unit being configured to automatically bring, when the protection function is deactivated, the autothrust into a state of engagement dependent on said state of engagement recorded by the recording unit.

The present invention further relates to an aircraft, in particular a transport airplane, which comprises a device such as that mentioned above.

DESCRIPTION OF THE DRAWING

The figures of the attached drawing will give a good understanding of how the invention can be produced. In these figures, identical references denote similar elements.

DESCRIPTION OF THE PREFERRED EMBODIMENTS

Figure 1:
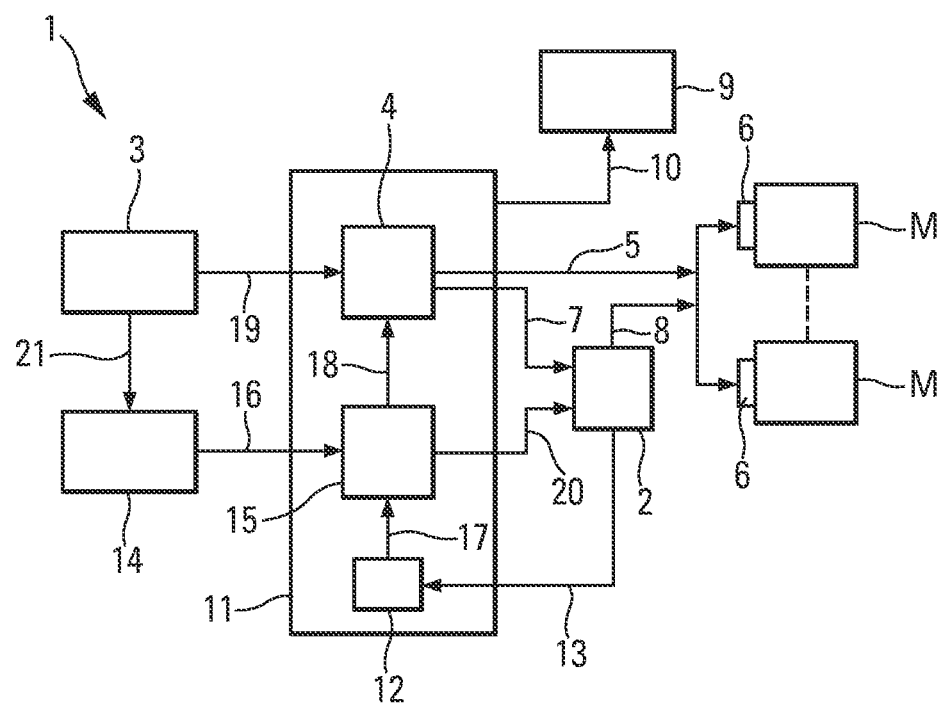
FIG. 1 is the block diagram of an energy protection device.

The device 1 illustrating an embodiment of the invention and schematically represented in FIG. 1 is an energy protection device for an aircraft (not represented), in particular a transport airplane, which is provided with at least one, but preferably a plurality, of usual engines M, as well as an autothrust 2 and a piloting control member (not represented), such as a control stick.

This device 1 comprises, to this end, means specified hereinbelow, which make it possible to protect the aircraft against low-energy situations (low speed, high angle of attack, low engine thrust) likely to constitute a hazard for safety, notably close to the ground.

For this, said device 1 is of the usual type comprising:

a monitoring unit 3 configured to automatically and repetitively monitor, during a flight of the aircraft, a plurality of data of said aircraft, including the angle of attack, so as to be able to detect, in the usual manner, a trigger situation, for which conditions for triggering an energy protection are satisfied; and an activation unit 4 which is linked via a link 19 to the monitoring unit 3 and which is formed in such a way as to automatically activate a protection function (preferably of "ALPHA FLOOR" type), if a trigger situation is detected by the monitoring unit 3. This protection function consists in automatically controlling said engines M in such a way as to modify the thrust delivered so that each supply a maximum thrust. For this, the activation unit 4 is linked via links 5 to usual means 6 intended to modify the thrust exerted by said engines M, notably by modifying the fuel supply to said engines M. The activation unit 4 also automatically engages (via a link 7) said autothrust 2 which is, for example, linked by a link 8 to said means 6.

Obviously, if the protection function is not activated, the different engines M of the aircraft are controlled in the usual manner, according to usual instructions generated notably by the pilot of the aircraft using the throttle (not represented).

Said device 1 can also comprise a display unit 9 which is linked via a link 10 to a unit 11 and which is likely to display a message warning a pilot of the aircraft of any activation of the protection function, for example by displaying an appropriate message on the screen, such as a primary flight screen of PFD (Primary Flight Display) type for example.

In a particular embodiment, the monitoring unit 3 comprises a plurality of sensors (not represented) for respectively measuring at least some of the following parameters: the angle of attack of the aircraft, the longitudinal attitude of the aircraft, the pitch speed of the aircraft, the speed of the aircraft and its rate of deceleration, the Mach number of the aircraft, the position of slants and foil flaps of the aircraft, the radio-altitude height of the aircraft. The monitoring unit 3 monitors these parameters to be able to detect low-energy situations of the aircraft.

Preferably, the monitoring unit 3 detects a trigger situation, to activate said protection function, if the energy of the aircraft is excessively low, in one of the following two cases:

the angle of attack of the aircraft is above a protection value (or the pitch angle is above a predetermined threshold and the order of the control member is above a predetermined nose-up threshold); and the filtered angle of attack becomes above a predetermined threshold.

In a preferred embodiment, the angle of attack of the aircraft comprises a compensation term intended to compensate variations of angle of attack generated by the pilot in phugoid mode, and thus avoid a deactivation of the energy protection function when it is still necessary.

Thus, upon the activation of the protection function, the following different actions are implemented:

automatic engagement of the autothrust 2;

application of the maximum thrust to the engines M; and
display of a corresponding message on a flight mode indicator of the aircraft of FMA (Flight Mode Annunciator) type, which is, for example, situated on the upper part of a primary flight screen of PFD type.

Said device 1 further comprises:

a recording unit 12 (linked for example by a link 13 to the autothrust 2) which is configured to automatically record, if the protection function is triggered, on a usual storage means, the state of engagement of the autothrust 2 (autothrust engaged or autothrust disengaged) at the time of the triggering of an energy protection by said activation unit 4;

an auxiliary monitoring unit 14 configured to, in the case of triggering of said protection function, implement a monitoring consisting in automatically and repetitively monitoring aircraft parameters, so as to be able to detect a return of the aircraft to a predetermined operational flight domain; and a deactivation unit 15 which is linked via links 16 and 17 respectively to said auxiliary monitoring unit 14 and to said recording unit 12 and which is formed in such a way as to perform the following operations:

automatically deactivating the protection function, for example via a link 18; and automatically bringing, when the protection function is deactivated, the autothrust 2 into a state of engagement dependent on said state of engagement recorded by the recording unit 12, for example via a link 20.

According to the invention, the operations of the deactivation unit 15 described above are performed if a return of the aircraft to said operational flight domain is detected by said auxiliary monitoring unit 14, and only if one of the following two conditions is also satisfied:

a relaxing of the control member is detected; and the angle of attack of the aircraft is below a predetermined threshold. Thus, if a return of the aircraft to an operational flight domain is detected, the device 1 according to the invention automatically deactivates the protection function and automatically manages the state of the autothrust 2. However, for that, one of the preceding two conditions must also be satisfied. By virtue of the invention, the aircraft does not therefore risk deactivating the protection function at the time of an avoidance maneuver which requires a maximum thrust from the engine or engines.

In the case of an avoidance maneuver, even if the speed of the aircraft is above the minimum reference speed and the angle of attack has become lower again, the protection function is deactivated only if the control member is relaxed and/or the angle of attack is below a predetermined threshold. This enables the aircraft to regain enough energy during the avoidance maneuver to return to the operational flight domain.

Furthermore, the autothrust 2 is brought (automatically) into a state which depends on the prior state of engagement, recorded previously, this state being matched to the flight phase likely to be implemented at the current time. No action is therefore required from the pilot in this phase of exiting from the energy protection function.

In a preferred embodiment:

if the state of engagement stored by the recording unit 12 indicates that the autothrust 2 was engaged at the time of the triggering of the protection function, said autothrust 2 is kept engaged. In this case, the thrust applied to the engines M of the aircraft is therefore managed entirely by the autothrust 2 if the latter is active; and if the state of engagement stored by the recording unit 12 indicates that the autothrust 2 was disengaged at the time of said triggering, said autothrust 2 is automatically disengaged, except in a particular go-around situation of the aircraft. In this case, the thrust applied to the engines M (on exiting the energy protection function) corresponds to the manual thrust controlled by the throttle.

Thus, the device 1 is automatic and makes it possible to free the pilot(s) of having to carry out manipulations or use particular controls linked to the activation of the protection mode or the stopping thereof.

In a particular embodiment, the activation unit 4, the recording unit 12 and the deactivation unit 15 notably can form part of a control unit 11.

Moreover, the auxiliary monitoring unit 14 detects a return of the aircraft to said operational flight domain, when the following two conditions are simultaneously satisfied:

first condition: the current corrected speed VCAS of the aircraft is above, for at least a predetermined duration, the sum of a reference speed dependent on the current flight configuration of the aircraft, of VLS type, and a predetermined threshold value; and second condition: the conditions for triggering the energy protection are no longer satisfied, this condition being, for example, deduced from information received from the monitoring unit 3 via a link 21.

The abovementioned threshold value is defined in such a way that the energy protection is not re-engaged immediately after the exit from the protection, to avoid excessively frequent switchovers.

Figure 2:
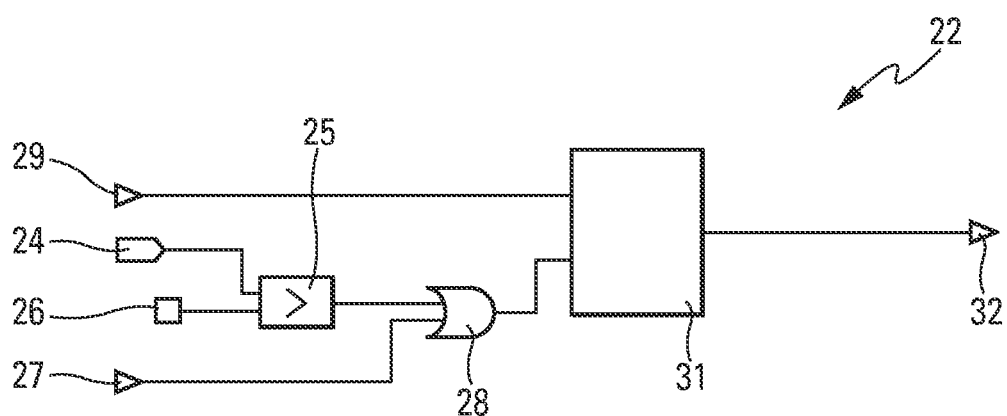
FIG. 2 is the block diagram of a particular embodiment of an element of a deactivation unit forming part of an energy protection device.

In a particular embodiment represented in FIG. 2, the control unit 11 comprises a control element 22 (implementing the functions of the units 4 and 15), which is configured to transmit an instruction to deactivate said protection function if one of the following two conditions is satisfied:

a relaxing of the control member is detected; and the angle of attack of the aircraft is below a predetermined threshold.

To this end, the control element 22 comprises:

an electronic component 24 for determining, in the usual manner, a value of the instruction (notably nose-up) of the control member of the aircraft;

an electronic component 25 for checking to see if the value of this instruction is below a threshold value which is, for example, recorded in a usual memory 26, and which corresponds for example to an instruction below mid-nose-up of the control member of the aircraft, which corresponds to a relaxing of the control member;

a usual electronic component 27 for determining whether the angle of attack is below a predetermined threshold;

an OR logic gate 28 for transmitting information when at least one of the two abovementioned conditions (a relaxing of the control member is detected; the angle of attack of the aircraft is below the predetermined threshold), is satisfied;

an electronic component 29 for detecting that an activation of the protection function, notably the activation condition linked to the control member, is satisfied;

a logic flip-flop 31 for transmitting an instruction to activate or deactivate the protection function; and a usual electronic component 32 for activating or deactivating the energy protection function as a function of the instruction received from the logic flip-flop 31.

The control element 22 operates as follows:

A) for activation:
- if the electronic component 29 detects the activation condition linked to the control member, it transmits the information to the logic flip-flop 31;
- the logic flip-flop 31 then transmits, at the output, an activation instruction intended for the electronic component 32;

B) for the deactivation:
- if the electronic component 27 determines that the angle of attack is below a predetermined threshold, it transmits the information to the OR logic gate 28;
- the electronic component 24 determines a value of the nose-up instruction from the control member of the aircraft and transmits it to the electronic component 25;
- the electronic component 25 compares this value to the predetermined threshold value;
- if the value of the nose-up instruction is below this threshold value, the electronic component 25 transmits the information to the OR logic gate 28;
- if the OR logic gate 28 receives one and/or the other item of information from the electronic components 25 and 27, it transmits information indicating that one or other of the abovementioned conditions is satisfied, to the logic flip-flop 31;
- the logic flip-flop 31 then supplies an instruction to deactivate the energy protection mode to the electronic component 32.

The invention claimed is:

1. An energy protection method for an aircraft which is provided with at least one engine, an autothrust, and at least one piloting control member, said method consisting:
   a) in automatically and repetitively monitoring, during a flight of the aircraft, a plurality of aircraft data, including an angle of attack of the aircraft, so as to be able to detect a trigger situation, for which conditions for triggering an energy protection are satisfied;
   b) if a trigger situation is detected, in automatically activating a protection function consisting in automatically engaging said autothrust if it is not already engaged and in automatically controlling said engine for it to supply a maximum thrust, and in implementing a monitoring consisting in automatically and repetitively monitoring aircraft parameters, so as to be able to detect a return of the aircraft to a predetermined operational flight domain; and
   c) if a return of the aircraft to said operational flight domain is detected, in automatically deactivating the protection function,
wherein said method consists, in the step c), in automatically deactivating the protection function, upon the detection of a return of the aircraft to said operational flight domain, only if at least one of the following conditions is also satisfied:
   a relaxing of the control member is detected, the relaxing of the control member being detected when the control member is in a position below a first predetermined nose-up threshold; and
   the angle of attack of the aircraft is below a predetermined threshold.

2. The method as claimed in claim 1,
wherein the angle of attack of the aircraft comprises a compensation term.

3. The method as claimed in claim 1,
wherein in the step b), a return of the aircraft to said operational flight domain is detected when the following two conditions are simultaneously satisfied:
   a current corrected speed of the aircraft is above, for at least a predetermined duration, a minimum reference speed dependent on the current flight configuration of the aircraft; and
   the conditions for triggering the energy protection are no longer satisfied.

4. The method as claimed in claim 1,
wherein the method consists:
   in the case of activation of the protection function in the step b), in automatically recording the state of engagement of the autothrust at the time of activation; and
   at the time of deactivation of the protection function in the step c), in automatically bringing the autothrust into a state of engagement dependent on said recorded state of engagement.

5. The method as claimed in claim 1,
wherein the conditions for triggering the energy protection are as follows:
   the angle of attack of the aircraft is above a predetermined value; and
   the control member is in a position above a second predetermined nose-up threshold.

6. The method as claimed in claim 1,
wherein it comprises, in addition, a step of automatically displaying an activation of the energy protection function when it occurs.

7. An energy protection device for an aircraft which is provided with at least one engine, an autothrust, and at least one piloting control member, said device comprising:
   a monitoring unit (3) configured to automatically and repetitively monitor, during a flight of the aircraft, a plurality of aircraft data, including an angle of attack of the aircraft, so as to be able to detect a trigger situation, for which conditions for triggering an energy protection are satisfied;
   an activation unit configured to automatically activate, if a trigger situation is detected, a protection function consisting in automatically engaging said autothrust if it is not already engaged and in automatically controlling said engine for it to supply a maximum thrust;
   an auxiliary monitoring unit configured to, in the case of triggering of said protection function, implement a monitoring consisting in automatically and repetitively monitoring aircraft parameters, so as to be able to detect a return of the aircraft to a predetermined operational flight domain; and
   a deactivation unit to, if a return of the aircraft to said operational flight domain is detected, automatically deactivate the protection function,
wherein said deactivation unit is configured to automatically deactivate the protection function, upon the detection by the auxiliary monitoring unit of a return of the aircraft to said operational flight domain, only if at least one of the following conditions is also satisfied:
   a relaxing of the control member is detected, the relaxing of the control member being detected when the control member is in a position below a first predetermined nose-up threshold; and
   the angle of attack of the aircraft is below a predetermined threshold.

8. The device as claimed in claim 7,
wherein it comprises a recording unit configured to automatically record, in the case of activation of the protection function, the state of engagement of the autothrust at the time of the triggering, said deactivation unit being configured to automatically bring, when the protection function is deactivated, the autothrust into a state of engagement dependent on said state of engagement recorded by the recording unit.

9. An aircraft,
wherein it comprises a device such as that specified under claim 7.

* * * * *